US012790273B2

(12) United States Patent
Robinson

(10) Patent No.: US 12,790,273 B2
(45) **Date of Patent: *Nov. 10, 2026**

(54) BUILDING PRODUCT

(71) Applicant: ADAPTAVATE LIMITED, Wokingham (GB)

(72) Inventor: Thomas James Christopher Robinson, Ashbourne (GB)

(73) Assignee: ADAPTAVATE Limited, Bristol (GB)

( * ) Notice: Subject to any disclaimer, the term of this patent is extended or adjusted under 35 U.S.C. 154(b) by 163 days.

This patent is subject to a terminal disclaimer.

(21) Appl. No.: 18/745,686

(22) Filed: Jun. 17, 2024

(65) Prior Publication Data

US 2024/0336529 A1 Oct. 10, 2024

Related U.S. Application Data

(63) Continuation of application No. 17/263,806, filed as application No. PCT/GB2019/052105 on Jul. 26, 2019, now Pat. No. 12,037,289.

(30) Foreign Application Priority Data

Jul. 27, 2018 (GB) ..................................... 1812291

(51) Int. Cl.

| | |
|---|---|
| ***C04B 18/24*** | (2006.01) |
| ***C04B 24/18*** | (2006.01) |
| ***C04B 24/38*** | (2006.01) |
| ***C04B 28/12*** | (2006.01) |
| *B29C 39/10* | (2006.01) |
| *C04B 28/02* | (2006.01) |
| *C04B 103/12* | (2006.01) |
| *C04B 103/22* | (2006.01) |
| *C04B 103/30* | (2006.01) |
| *C04B 111/00* | (2006.01) |

(52) U.S. Cl.

CPC .............. *C04B 28/12* (2013.01); *C04B 18/24* (2013.01); *C04B 18/248* (2013.01); *C04B 24/18* (2013.01); *C04B 24/38* (2013.01); *C04B 24/383* (2013.01); *C04B 28/02* (2013.01); *C04B 2103/12* (2013.01); *C04B 2103/22* (2013.01); *C04B 2103/302* (2013.01); *C04B 2111/00612* (2013.01); *C04B 2111/0062* (2013.01); *Y02W 30/91* (2015.05)

(58) Field of Classification Search

CPC ................ B29C 39/02–126; B29C 43/22–305

See application file for complete search history.

(56) References Cited

U.S. PATENT DOCUMENTS

| | | | | |
|---|---|---|---|---|
| 4,298,413 A * | 11/1981 | Teare | B65G 57/04 | 83/402 |
| 6,547,901 B1 * | 4/2003 | Gerlich | B28B 19/0092 | 156/39 |
| 6,916,369 B2 * | 7/2005 | Chun | C04B 24/06 | 106/725 |
| 7,041,167 B2 * | 5/2006 | Jiang | C04B 22/06 | 106/713 |
| 7,364,676 B2 * | 4/2008 | Sucech | B32B 13/08 | 425/102 |
| 7,846,278 B2 * | 12/2010 | Porter | E04C 2/06 | 156/39 |
| 8,460,460 B2 * | 6/2013 | Shendy | C04B 7/26 | 106/729 |
| 8,968,621 B2 * | 3/2015 | Spikermann | C04B 11/002 | 181/294 |
| 10,059,033 B2 * | 8/2018 | Wittbold | B05C 5/0254 | |
| 12,037,289 B2 * | 7/2024 | Robinson | C04B 28/02 | |
| 12,503,398 B2 * | 12/2025 | Robinson | C04B 28/12 | |
| 2008/0099122 A1 | 5/2008 | Andersen et al. | | |
| 2015/0024228 A1 * | 1/2015 | Li | B28B 19/0092 | 156/39 |
| 2018/0022653 A1 * | 1/2018 | Perez-Pena | C04B 24/26 | 521/83 |
| 2018/0215664 A1 | 8/2018 | Robinson | | |
| 2021/0171397 A1 | 6/2021 | Robinson | | |

FOREIGN PATENT DOCUMENTS

| | | | | |
|---|---|---|---|---|
| FR | 2992640 | A1 | | 1/2014 |
| FR | 3058137 | A1 | | 5/2018 |
| JP | H10305409 | A | | 11/1998 |
| JP | 2001300925 | A | * | 10/2001 |
| JP | 2003516880 | A | | 5/2003 |
| JP | 2005281015 | A | * | 10/2005 |
| KR | 20040108662 | A | | 12/2004 |
| WO | WO2003078347 | A2 | | 9/2003 |
| WO | WO2014072533 | A1 | | 5/2014 |
| WO | WO2017013413 | | | 1/2017 |

OTHER PUBLICATIONS

Bessette, "FR-2992640-A1 Machine Translation", 8 pgs.

Britannica, "Hemp Plant", retrieved Feb. 2022 at <<https://www.britannica.com/plant/hemp>>, 12 pgs.

Brzyski, et al., "Composite Materials Based on Hemp and Flax for Low-Energy Buildings", Materials 2017, 10,510, DOI:10.3390/ma10050510, 2017, 23 pgs.

Canadian Office Action mailed on Jan. 31, 2024, for Canadian Patent Application No. 3,107,698, a foreign counterpart of U.S. Appl. No. 17/263,806, 4 pages.

Ciment Prompt natural cement, retrieved Aug. 1, 2022 at <<http://www.cimentetarchitecture.com/en/Prompt-natural-cement/Manufacturing/Chemical-mineralogical-and-physical-characteristics>>, 2016. 2 pgs.

Encyclopedia Brittanica, Bagasse, retrieved Aug. 15, 2023, at <<https://www.britannica.com/technology/bagasse>>, 2015, 1 pg.

(Continued)

*Primary Examiner* — Atul P. Khare

(74) *Attorney, Agent, or Firm* — Lee & Hayes, P.C.

(57) ABSTRACT

A building product in the form of an internal lining board. The board is made up of a mixture of a food crop byproduct, a binder, a water reducing agent, cellulose, and water. The mixture is provided between two sheets of lining paper.

19 Claims, No Drawings

(56) References Cited

OTHER PUBLICATIONS

Gearspace forum, “MDF, Plywood, or Drywall for internal walls?”, retreived Aug. 22, 2023, at <<https://gearspace.com/board/studio-building-accoustics/408039-mdf-plywood-internal-walls.html>>, 2009, 7 pgs.
The International Search Report and Written Opinion for related PCT application, PCT/GB2019/052105, mailed Oct. 30, 2019, 12 pages.
The Korean Office Action Mailed Feb. 27, 2024 for Korean Patent Application 10-2021-7006220 a foreign counterpart to U.S. Appl. No. 17/263,806.
Office Action for U.S. Appl. No. 17/263,806, mailed on Jan. 24, 2023, Robinson, “Building Product”, 25 pages.
Office Action for U.S. Appl. No. 17/263,806, mailed on Aug. 5, 2022, Robinson, “Building Product”, 24 pages.
Office Action for U.S. Appl. No. 17/263,806, mailed on Sep. 13, 2023, Robinson, “Building Product”, 35 Pages.
Oginni, et al., “Pyrolysis of dedicated bioenergy crops grown on reclaimed mine land in West Virginia”, Journal of Analytical and Applied Pyrolysis, 123. DOI:10,1016/j.jaap.2016.11.013, 2017, pp. 319-329.
Ouyang, et al., “Physicochemical characterization of calcium lignosulfonate—A potentially useful water reducer”, Colloids and Surfaces A: Physichemical and Enginerring Aspects, v282-283, DOI:10.1016/j.colsurfa.2005.12.020, 2006, pp. 489-497.

* cited by examiner

BUILDING PRODUCT

CROSS REFERENCE TO RELATED APPLICATIONS

This application is a continuation application of U.S. patent application Ser. No. 17/263,806, filed Jan. 27, 2021, which is a US national stage entry of International Patent Application No. PCT/GB2019/052105, filed Jul. 26, 2019, which claims priority to GB1812291.1, filed Jul. 27, 2018, the entire contents of each of which are incorporated by reference herein.

BACKGROUND OF THE DISCLOSURE

This invention concerns a building product, and particularly a building product in the form of an internal lining board.

There is a continuing movement to improve the energy efficiency of buildings and the health of the internal environment and its occupants, to inter alia reduce the carbon dioxide emissions associated with the built environment. Accordingly, a number of steps have been made to produce more energy efficient buildings, including a number of retro fitting interventions. These though have often had negative unintended consequences relating inter alia to the poor management of moisture within the building, caused for instance by increasing the thermal resistivity and air tightness of buildings. This can lead to degradation of the building, unhealthy living environments and occupant health issues. The increasing of air tightness and thermal resistivity of buildings can lead to increased condensation, and hence cause mould growth.

The most commonly used internal lining product is plasterboard. The material of this product however has a very poor hygroscopic ability, i.e., the ability to absorb and desorb water vapours, and is not thermally insulating. Furthermore, gypsum used to make plasterboard is a finite resource. Moreover, plasterboard once finished with has to be treated as a controlled waste as it can emit hydrogen sulphide when mixed with organic matter and water.

All percentages given in this specification, unless indicated otherwise, are percentages by weight.

According to a first aspect of the invention there is provided a building product in the form of an internal lining board, the board being made up of a mixture of the following materials.

a. Food crop byproduct
b. Binder
c. Water reducing agent
d. Cellulose
e. Water with the mixture being provided between two sheets of lining paper.

The food crop byproduct may comprise any of:

Common wheat
Hemp
Oats
Rapeseed
Barley straw
Giant *miscanthus*
Bamboo
Flax
Rice straw
Corn straw
Sugarcane bagasse
Sisal straw The food crop byproduct may include cellulose, and may include between 5 and 50% cellulose.

The food crop byproduct may include hemi-cellulose, and may include between 6 and 50% hemi-cellulose.

The food crop byproduct may include lignin, and may include between 8 and 30% lignin.

The binder may include a cementitious product which may be a natural cement.

The cementitious product may have the following constituents:

| | |
|---|---|
| $(CaO)_2\ SiO_2$ | 40-60% |
| $(CaO)_3\ SiO_2$ | 5-8% |
| $(CaO)_3\ Al_2O_3$ | 6% ± 2 |
| $(CaO)_4\ Al_2O_3\ Fe_2O_3$ | 9% ± 2 |
| $(CaO)_{12}\ (Al_2O_3)_7$ | 3% ± 1 |
| $CaCO_3$ | 10-15% |
| $Ca_5\ (SiO_4)_2\ CO_3$ | 10-15% |
| $(CaO)_4\ (Al_2O_3)_3\ SO_3$ | 3% ± 1 |
| $K_2\ Mg_2\ (SO_4)_3$ | 1% ± 0.5 |
| $CaSO_4$ | 2% ± 1 |
| CaO | 2% ± 2 |
| MgO | 4% ± 1 |
| $SiO_2$ | 1% ± 0.5 |
| $(CaO)_2\ Al_2O_3\ SiO_2$ | 1.5% ± 0.5 |
| Other amorphous solids | 4% ± 2 |

The cellulose may be in the form of hydroxy ethyl methyl cellulose. The cellulose may be included within the binder, and within the cementitious product of the binder. The cellulose may be included in the cementitious product in a proportion of between 0.5% and 5%, and more particularly between 0.5% and 1.5%, of the total binder weight.

The binder may include hydrated lime and may include a natural hydraulic lime.

The hydrated lime may constitute between 35 and 60% of the binder.

The food crop byproduct to binder ratio may be between 1:6 and 1:3.

The water reducing agent may be calcium lignosulphonate, and up to 1.5% calcium lignosulphonate solution may be provided in the mixture prior to drying.

The building product may include in total between 65% and 85% binder, water reducing agent and cellulose.

The building product may include between 15% and 35% food crop byproduct.

The building product may have a moisture content of between 0.3% and 2%.

The material may also include an air entraining agent.

The particle size of the majority of the food crop byproduct particles in the mixture may be less than a third of the thickness of the board, and substantially no particles which have a particle size greater than half the thickness of the board, may be included in the mixture.

According to a further aspect of the invention there is provided a method of forming a building product according to any of the preceding seventeen paragraphs, the method comprising mixing together the materials of the product and locating the mixture between two sheets of lining paper.

The material may be extruded between the two sheets of lining paper. The components of the binder may be mixed together dry and then mixed with the water and the water reducing agent to form a slurry. The water may be heated for instance up to 90° C., before mixing. The food crop byproduct may be mixed with the slurry to form a paste which is then located between the sheets of the lining paper.

Heat may be applied to the newly extruded composite shortly after the point of forming to decrease the initial set time. This may be via direct contact, through conduction in the forming belt, or indirectly through convection or infrared heat.

A retarder may be included to delay setting of the materials and the retarder may be citric acid.

Alternatively, an accelerator may be provided to accelerate setting of the materials, which accelerator could be sodium carbonate.

The binder may form substantially 35-45% of the slurry.

The product may be dried after location of the paste between the sheets of lining paper.

The density of the material in the product after drying may be between 500 and 750 kg/$m^3$ and the lining paper may be recycled. The lining paper may have a weight of between 150 and 210 g/$m^2$, and more particularly between 170 and 200 g/$m^2$.

Embodiments of the present invention will now be described by way of example only.

A building product in the form of an internal lining board is formed as follows. A natural cement including 1% by weight hydroxy ethyl methyl cellulose is mixed with hydrated lime.

Water is mixed with calcium lignosulphonate solution water reducing agent and mixed with the dry mix of cement and lime. These are combined and mixed to form a slurry. A food crop byproduct is mixed with the slurry, to form a paste.

The paste is distributed across a continuously moving belt onto a sheet of recycled paper lining material, and the paste is then extruded between the bottom layer of paper and a top layer of similar paper moving around a roller to provide a board of required thickness. The board may be subject to vibrating pads or rollers to ensure that it is flat and smooth. The lining paper is folded around the edges of the board.

Once the material in the board is hard enough it can be cut, for instance by a water jet cutter. The product will then be stacked in racking and taken to a drying chamber with a temperature of 20° C.+−2° C. and 50% RH+−10% RH for curing and drying, typically for 3 to 5 days. After drying the product, it should be ready for use.

The food crop byproduct may be any of the following, though this list should not be considered to be exhaustive:—

Common wheat (*Triticum aestivum*)
Hemp-*Cannabis Sative*
Oats-*Avena sativa*
Rapeseed (*Brassica napus*)
Barley straw
Giant *Miscanthus* (*Miscanthus giganteus*)
Bamboo
Flax
Rice straw
Corn straw
Sugarcane bagasse
Sisal straw All of these products should have cellulose, hemi-cellulose and lignin and within the following proportions.

| | |
|---|---|
| Cellulose | 5-50% |
| Hemi-cellulose | 5-50% |
| Lignin | 8-30% |

The particle size distribution within the material is important. In the first instance a majority of the particles should be less than a third of the thickness of the board, and substantially no particles should be greater than half of the thickness of the board.

The board thus produced should have a density of between 500 kg/$m^3$ and 750 kg/$m^3$.

Three examples of board, are formed with the following proportions.

| Materials | Example 1 | Example 2 | Example 3 |
|---|---|---|---|
| Cementitious product including cellulose | 41.5% | 50.0% | 36.2% |
| Hydrated Lime | 38.0% | 30.0% | 33.3% |
| Food crop byproduct | 20.5% | 20.0% | 30.5% |

The proportions of liquid components added to the above dry components are as follows:—

| Materials | Example 1 | Example 2 | Example 3 |
|---|---|---|---|
| Water | 49.3% | 50.0% | 55.0% |
| Calcium lignosulphante solution | 0.3% | 0.1% | 1.0% |

The proportions of components in the finished products, with the binder including the cementitious product, cellulose and lime, are as follows:—

| Materials | Example 1 | Example 2 | Example 3 |
|---|---|---|---|
| Binder | 79.0% | 79.8% | 68.7% |
| Food crop by product | 20.0% | 19.8% | 29.8% |
| Moisture Content | 1.0% | 0.4% | 1.5% |

Example 1 is a standard product. In Example 2 a greater proportion of cementitious product to hydrated lime is provided to increase hardness, sheer strength and compressive strength. Compressive strength and sheer strength for instance increase the ability for the product to take a screw. This increase in compressive strength will increase flexural rigidity.

Example 3 provides a more thermally and acoustically insulative product, with improved hygrothermal performance.

The finished products provide a paper faced lining board which can be cut to size by cutting the sheets with a knife and snapping the board within. The product can be attached to stud work or walls with screws in a conventional manner. The board can have square edges or tapered edges to permit jointing.

The products thus formed provide for commercial scale production of compostable materials which are fast setting. The drying process is without high temperatures or pressure and this helps to reduce the embodied energy and cost to make the product. The cellulose used has been found to improve the strength of the board and also create a bond between the paper and the board materials.

The inclusion of cellulose to the cementitious binder also improves the interface between the binder and the aggregate, creating a more structurally homogeneous composite. Conventional internal lining boards do not use compostable materials and can also use a high energy input during production. The product thus formed is lighter weight than conventional products, reducing health and safety risk at the point of installation, as well as embodied energy for transportation.

Various modifications may be made without departing from the scope of the invention. For instance retardants such as citric acid may be included if it is required to slow down curing, or accelerants such as sodium carbonate may be used if required to speed up curing. Air entraining agents may be used to improve flow of the paste in the process. Different drying conditions may be applied. The materials may be used in different proportions or combinations of those indicated. Other food crop byproducts may be suitable for use.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of producing an internal lining board, the method comprising:

mixing at least a binder, a water reducing agent and water to form a slurry, wherein the binder forms substantially 35 wt. % to 45 wt. % of the slurry;

mixing at least a food crop byproduct with the slurry to form a paste; and locating the paste between two sheets of lining paper.

2. The method according to claim 1, wherein locating the paste between two sheets of lining paper comprises distributing the paste across a continuously moving belt onto a sheet of the two sheets of lining paper.

3. The method according to claim 1, wherein locating the paste between two sheets of lining paper comprises extruding the paste between the two sheets of lining paper.

4. The method according to claim 1, wherein the water is heated before the mixing of at least the binder, the water reducing agent and the water to form the slurry.

5. The method according to claim 4, wherein the water is heated before the mixing.

6. The method according to claim 1, wherein locating the paste between the two sheets of lining paper forms at least part of an internal lining board, and the method further comprises using vibrating pads or rollers to flatten the internal lining board.

7. The method according to claim 1, further comprising cutting the lining board using a water jet cutter.

8. The method according to claim 1, wherein locating the paste between the two sheets of lining paper forms at least part of an internal lining board, and the method further comprises drying the internal lining board.

9. The method according to claim 8, wherein the lining board after the drying has a moisture content of between 0.3% and 2%.

10. The method according to claim 8, wherein the density of the lining board after the drying is between 500 and 750 $kg/m^3$.

11. The method according to claim 10, wherein the binder comprises lime and a cementitious product, and wherein the cementitious product forms a greater proportion of the binder than the lime.

12. The method according to claim 1, wherein the lining paper is recycled lining paper.

13. The method according to claim 1, wherein the lining paper has a weight of between 150 and 210 $g/m^2$.

14. The method according to claim 1, wherein the binder comprises lime and a cementitious product.

15. The method according to claim 1, wherein the food crop byproduct comprises any of: common wheat, oats, rapeseed, barley straw, giant *miscanthus*, bamboo, flax, rice straw, corn straw, sugarcane bagasse, or sisal straw.

16. The method according to claim 1, wherein the binder comprises lime and wherein the lime consists essentially of hydrated lime.

17. The method according to claim 16, wherein the hydrated lime constitutes between 35 and 60 wt. % of the binder.

18. A method of producing an internal lining board, the method comprising:

mixing at least a binder, a water reducing agent and water to form a slurry, wherein the binder includes lime and a cementitious product, and wherein the binder forms substantially 35 wt. % to 45 wt. % of the slurry;

mixing at least a food crop byproduct with the slurry to form a paste;

distributing the paste across a continuously moving belt onto a bottom sheet of lining paper;

extruding the paste between the bottom sheet of lining paper and a top sheet of lining paper to form at least part of an internal lining board;

using vibrating pads or rollers to flatten the internal lining board;

cutting the internal lining board; and drying the internal lining board in a drying chamber, wherein the density of the lining board after the drying is between 500 $kg/m^3$ and 750 $kg/m^3$.

19. A method of producing an internal lining board, the method comprising:

mixing at least a binder, a water reducing agent and water to form a slurry, wherein the binder forms substantially 35 wt. % to 45 wt. % of the slurry, wherein the binder comprises lime, the lime consisting essentially of hydrated lime, and wherein the hydrated lime constitutes between 35 and 60 wt. % of the binder;

mixing at least a food crop byproduct with the slurry to form a paste;

extruding the paste between a bottom sheet of lining paper and a top sheet of lining paper to form at least part of an internal lining board;

cutting the internal lining board; and drying the internal lining board in a drying chamber, wherein the density of the lining board after the drying is between 500 $kg/m^3$ and 750 $kg/m^3$ and the lining board after the drying has a moisture content of between 0.3% and 2%.

* * * * *